(12) United States Patent
Endoh

(10) Patent No.: US 6,975,217 B2
(45) Date of Patent: Dec. 13, 2005

(54) VEHICLE FUEL MILEAGE METER

(75) Inventor: Kazuyuki Endoh, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 52 days.

(21) Appl. No.: 10/616,910

(22) Filed: Jul. 11, 2003

(65) Prior Publication Data

US 2004/0008109 A1   Jan. 15, 2004

(30) Foreign Application Priority Data

Jul. 11, 2002 (JP) .............................. 2002-202386

(51) Int. Cl.⁷ ............................................. B60Q 1/00
(52) U.S. Cl. .................. 340/438; 340/450.2; 340/441; 701/123
(58) Field of Search .............................. 340/450.2, 438, 340/441, 318, 439; 701/123, 29–35

(56) References Cited

U.S. PATENT DOCUMENTS

| | | | | |
|---|---|---|---|---|
| 4,523,457 A | * | 6/1985 | Bayer et al. | 73/114 |
| 4,544,909 A | * | 10/1985 | Di Nunzio | 340/439 |
| 4,706,083 A | * | 11/1987 | Baatz et al. | 701/123 |
| 5,422,625 A | * | 6/1995 | Sakaemura | 340/461 |
| 6,086,511 A | * | 7/2000 | Droge | 477/121 |
| 6,092,021 A | * | 7/2000 | Ehlbeck et al. | 701/123 |
| 6,253,129 B1 | * | 6/2001 | Jenkins et al. | 701/29 |
| 6,571,168 B1 | * | 5/2003 | Murphy et al. | 701/123 |

* cited by examiner

Primary Examiner—Jeffery Hofsass
Assistant Examiner—Jennifer Stone
(74) Attorney, Agent, or Firm—Arent Fox PLLC (57) ABSTRACT

A vehicle fuel mileage meter capable of displaying a value approximate to a fuel mileage obtained from actual driving only is provided. The fuel mileage meter includes a fuel mileage display and a control unit. The control unit controls display of a fuel mileage on the fuel mileage display based on a distance traveled and an amount of fuel consumed after a vehicle speed exceeds a predetermined threshold.

5 Claims, 9 Drawing Sheets

VEHICLE FUEL MILEAGE METER

FIELD OF THE INVENTION

The present invention relates to an improvement in a fuel mileage meter for displaying a rate of fuel consumption of a vehicle.

BACKGROUND OF THE INVENTION

Fuel consumption is generally expressed in a rate (hereinafter referred to as "fuel mileage"). Fuel mileage is provided by dividing an amount of consumed fuel by a traveled distance.

Figure 9:
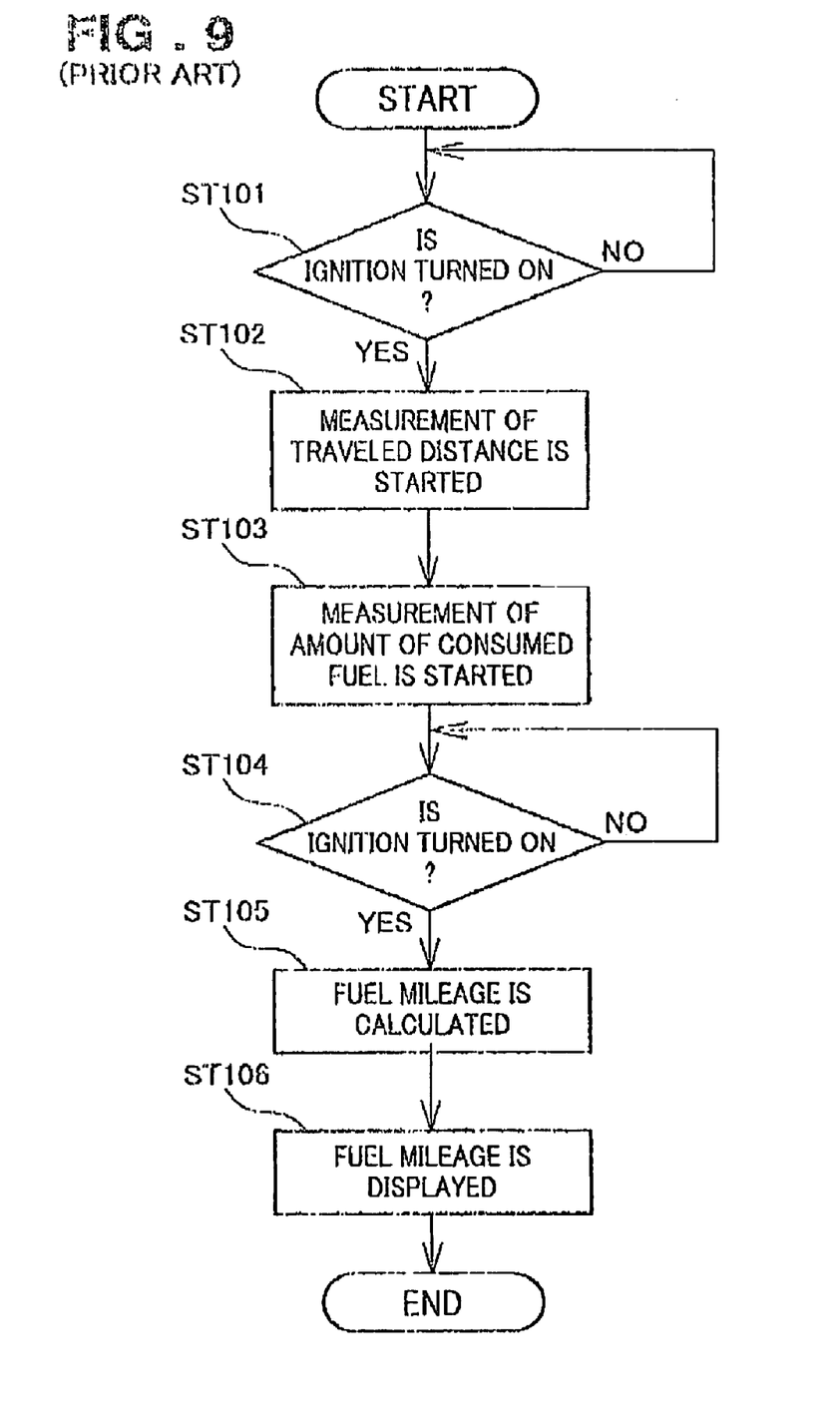
FIG. 9 is a flowchart illustrating calculation of a fuel mileage rate in a conventional vehicle fuel mileage meter.

In a certain conventional fuel mileage meter, fuel mileage is calculated in accordance with the following steps:

STEP (hereinafter abbreviated as ST) 101: Determination is made as to whether an ignition is "ON." In other words, it is determined whether an engine is started. When the answer is YES, the process proceeds to ST102, and when NO, repeats ST101.

ST102: Measurement of distance of travel is started.

ST103: Measurement of the amount of consumed fuel is started.

ST104: It is determined whether the ignition is "OFF." When the answer is YES, the process proceeds to ST105, and when NO, repeats ST104.

ST105: Fuel mileage is calculated.

ST106: The fuel mileage is displayed.

In the conventional fuel mileage calculation method, measurement of the amount of consumed fuel is performed from the start of the engine for eventual fuel mileage display. Upon start, engines are in an idling state. Inclusion for display of fuel consumption in such an idling state adversely affects the usefulness of fuel mileage display.

Assume that after an engine is started, an idling time of ten minutes is required to wait for someone, and thereafter the vehicle travels along a crowded street. Fuel mileage displayed in such a case is estimated to be smaller than that in the case of traveling along a non-crowded street or an expressway. In certain instances, it should be clarified whether the smaller fuel mileage resulted from the idling or travel along a crowded street.

Thus, demand grows for capability to display fuel mileage reflecting fuel consumption from actual driving and for enhanced usefulness of fuel mileage display.

SUMMARY OF THE INVENTION

According to an aspect of the present invention, there is provided a vehicular fuel mileage meter which comprises: a fuel mileage display for displaying a rate of fuel consumption of a vehicle; and a control unit for controlling display of the fuel consumption rate on the fuel mileage display based on a distance traveled and an amount of fuel consumed after a vehicle speed exceeds a predetermined threshold.

If the displayed fuel mileage is one obtained from actual driving only, it can be utilized as useful information for the driver. Also, the driver can easily become aware that "the driving with relatively fewer waits at stoplights has led to the improved fuel economy" or "the driving along a crowded street has led to the bad fuel economy," for example.

Accordingly, as described above, the control unit is provided for controlling display of the fuel mileage on the fuel mileage display based on the traveled distance and the amount of fuel consumed after the vehicle speed exceeds the predetermined threshold, with the amount of fuel consumed during idling at the start, for example, excluded from the fuel mileage calculation. As a result, a value of fuel mileage close to a fuel mileage in actual traveling can be displayed to thereby provide the driver with the useful fuel mileage information.

Preferably, the control unit comprises a traveled distance calculator for calculating the distance traveled after the vehicle speed exceeds the predetermined threshold, a consumed fuel amount calculator for calculating the amount of fuel consumed after the vehicle speed exceeds the predetermined threshold, and a fuel mileage calculator for calculating fuel mileage based on the traveled distance and the consumed fuel amount.

The fuel mileage display is preferably provided at a meter indicator portion provided in an instrument panel.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
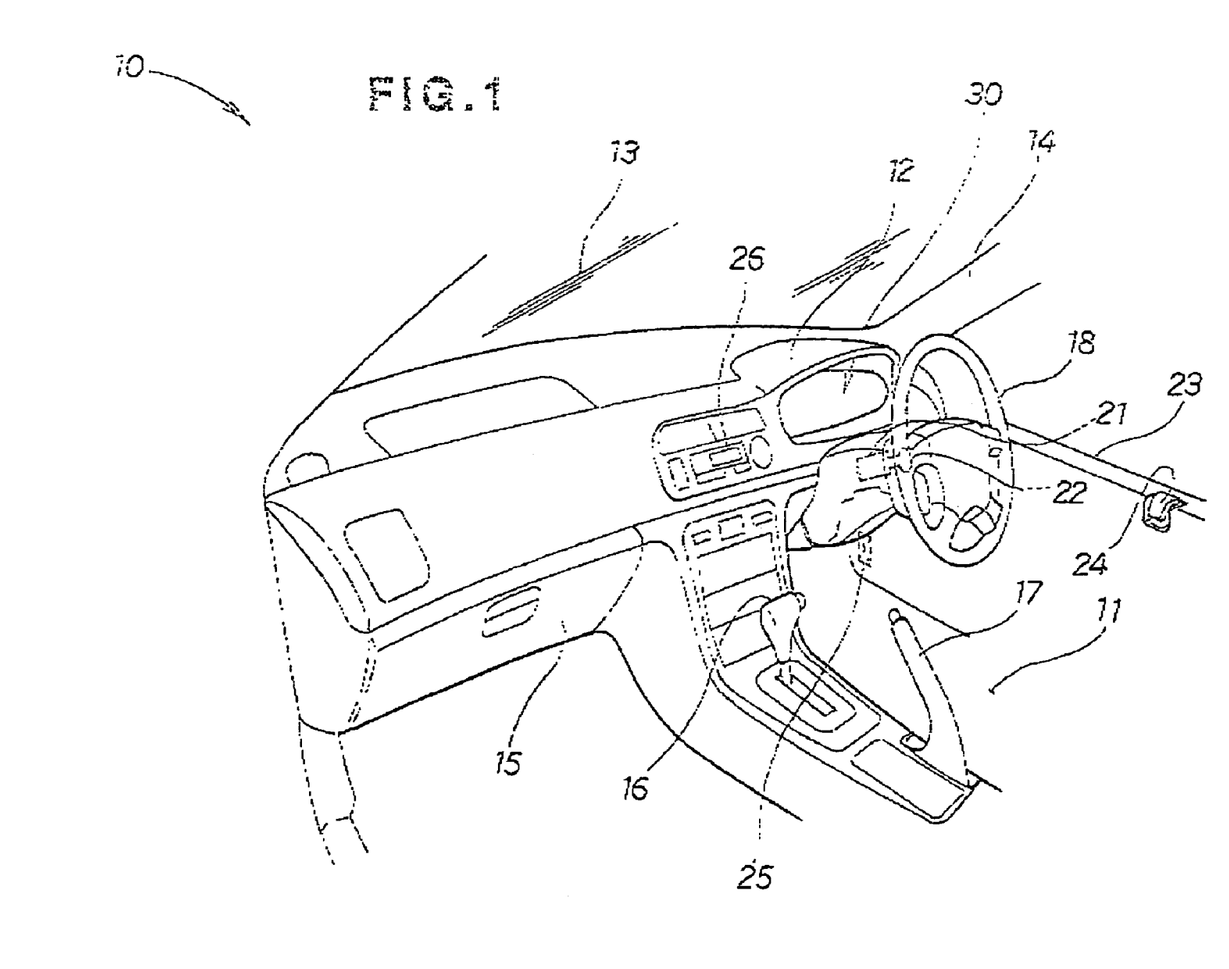
FIG. 1 is a perspective view of a vehicle compartment equipped with a meter unit which includes a vehicle fuel mileage meter according to the present invention.

Initial reference is made to FIG. 1 showing in perspective a vehicle compartment equipped with a meter unit which includes a vehicle fuel mileage meter according to the present invention. In the figure, reference numeral 10 denotes a vehicle, 11 a passenger compartment, 12 an instrument panel, 13 a windshield, 14 an A-pillar, 15 a glove box, 16 a shift lever, 17 a handbrake, 18 a steering wheel, 21 an ignition switch, 22 an ignition key, 23 a door, 24 a door lock, 25 a door switch, 26 a clock, and 30 a meter unit.

Figure 2:
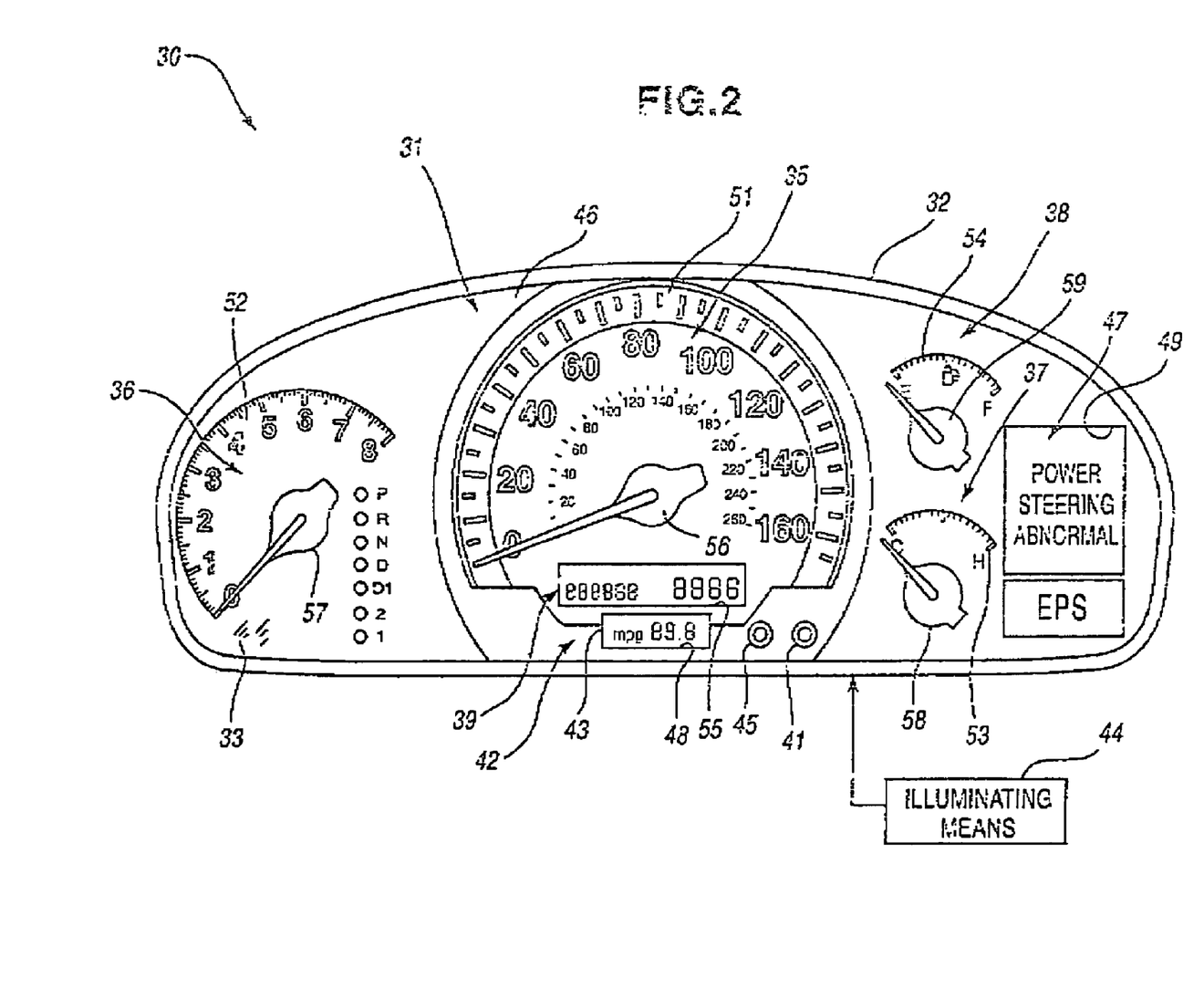
FIG. 2 is a front view of the meter unit including the vehicle fuel mileage meter of the present invention.

FIG. 2 illustrates the meter unit 30 including the vehicle fuel mileage meter of the present invention. The meter unit 30 consists of a meter indicator portion 31 for showing vehicle information, time information, driving conditions information and the like, a housing 32 containing the meter indicator portion 31, and a clear cover 33 put over the housing 32 to transparently cover the meter indicator portion 31.

The meter indicator portion 31 has a speedometer 35 for indicating vehicle speed, a tachometer 36 for indicating the number of revolutions of an engine, a coolant temperature gauge 37 for indicating the temperature of coolant, a fuel gauge 38 for indicating the remaining amount of fuel, a liquid crystal display 39 for showing integrated distance, traveled distance or air temperature, a switch 41 for switching the displayed contents of the liquid crystal display 39, a fuel mileage display 43 as a display member of the vehicle fuel mileage meter 42 for showing a rate of fuel consumption (fuel consumption), a display button 45 for displaying fuel mileage on the fuel mileage display 43, an abnormality display 47 for showing abnormality or malfunction, and an illuminating means 44 for illuminating the speedometer 35, tachometer 36, coolant temperature gauge 37, fuel gauge 38, liquid crystal display 39, fuel mileage display 45 and abnormality display 47.

In the figure, reference numeral 46 denotes a character board for showing graphics or characters of the meter indicator portion 31. More specifically, the character board 46 has a dial 51 of the speedometer 35, a dial 52 of the tachometer 36, a dial 53 of the coolant temperature gauge 37, a dial 54 of the fuel gauge 38, a display window 55 of the liquid crystal display 39, a display window 48 of the fuel mileage display 43, and a display window 49 of the display 47 for showing abnormality or malfunction.

Reference numeral 56 denotes a needle of the speedometer 35, 57 a needle of the tachometer 36, 58 a needle of the coolant temperature gauge 37, and 59 a needle of the fuel gauge 38.

Figure 3:
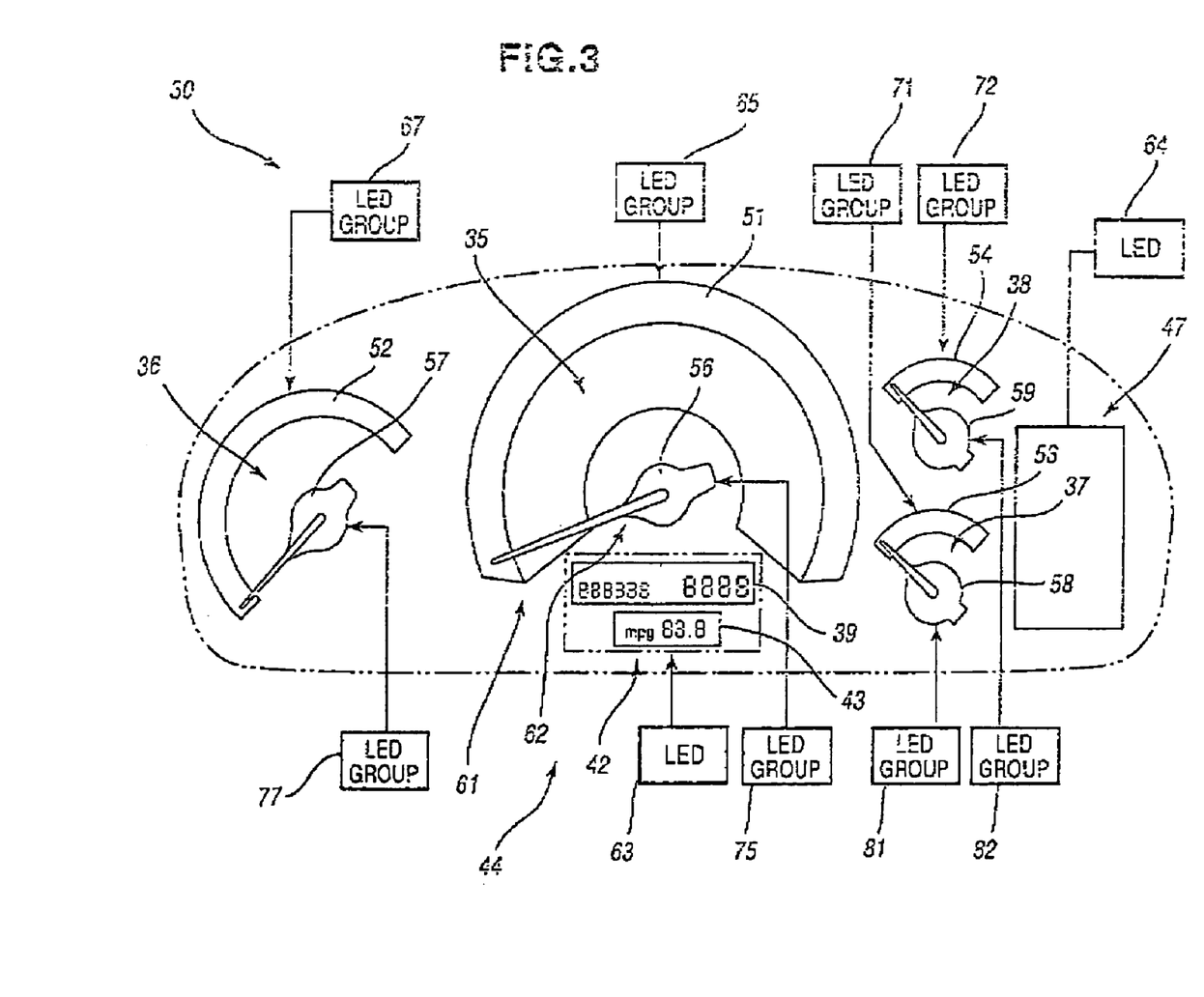
FIG. 3 is a block diagram illustrating a specific example of an illuminating means shown in FIG. 2.

Next, reference is made to FIG. 3 illustrating a specific example of the illuminating means 44 in the meter unit 30 of FIG. 2.

The illuminating means 44 includes a dial illuminating means 61 for illuminating the dials 51 to 54, a needle illuminating means 62 for illuminating the needles 56 to 59, a liquid-crystal-illuminating LED (light emitting diode) 63 for illuminating the liquid crystal display 39 and fuel mileage display 43, and a display-illuminating LED 64 for illuminating the abnormality display 47 for showing abnormality or malfunction.

The dial illuminating means 61 consists of a group of character-illuminating LEDs 65 for illuminating the dial 51 of the speedometer 35, a group of character-illuminating LEDs for illuminating the dial 52 of the tachometer 36, a group of character-illuminating LEDs 71 for illuminating the dial 53 of the coolant temperature gauge 37, and a group of character-illuminating LEDs 72 for illuminating the dial 54 of the fuel gauge 38.

The needle illuminating means 62 consists of a group of needle-illuminating LEDs 75 for illuminating the needle 56 of the speedometer 35, a group of needle-illuminating LEDs 77 for illuminating the needle 57 of the tachometer 36, a group of needle-illuminating LEDs 81 for illuminating the needle 58 of the coolant temperature gauge 37, and a group of needle-illuminating LEDs 82 for illuminating the needle 59 of the fuel gauge 38.

Figure 4:
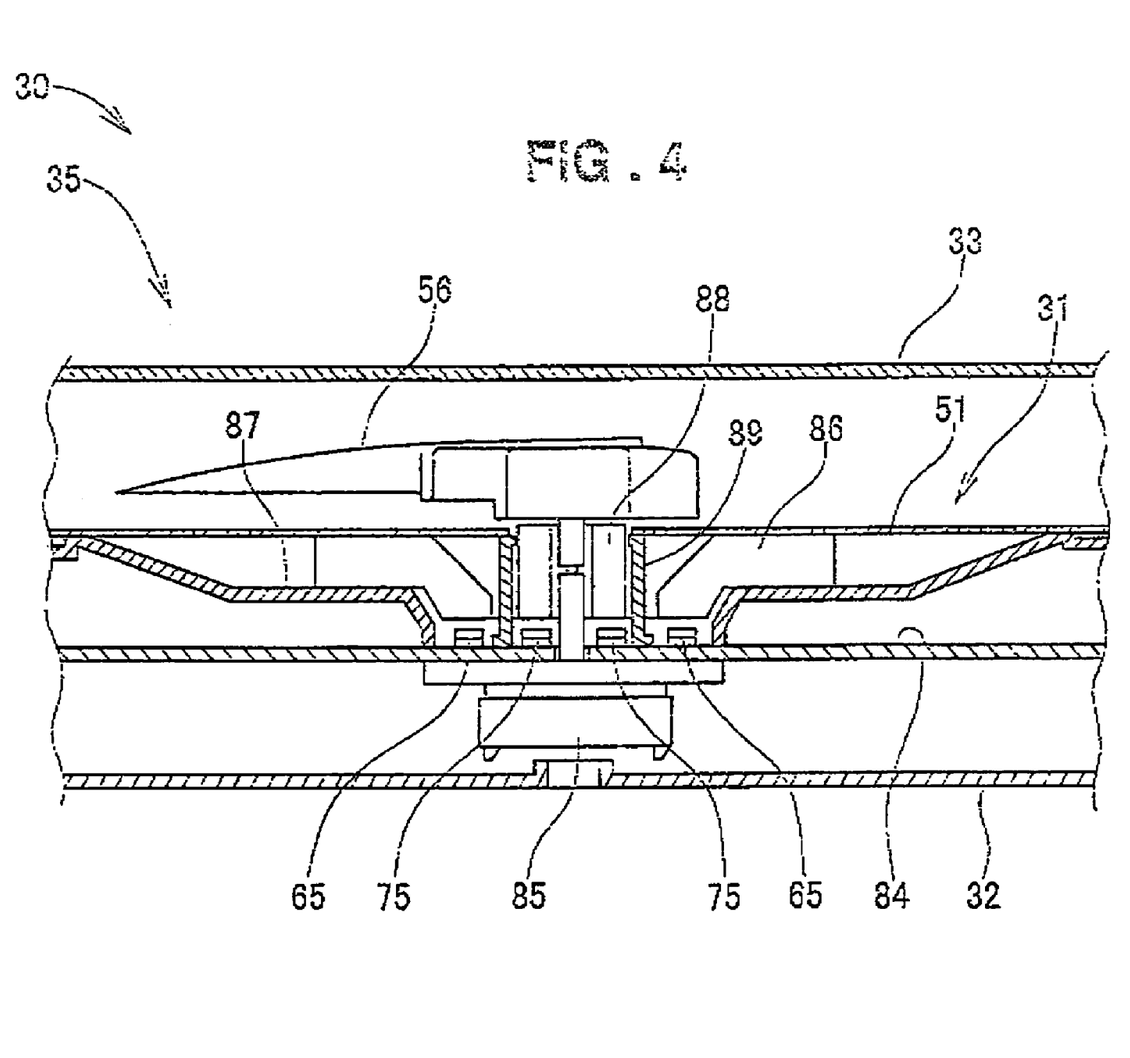
FIG. 4 is a cross-sectional view of the meter unit of FIG. 2.

Now, a configuration of the speedometer 35 will be described with reference to FIG. 4.

The speedometer 35 consists of a base plate 84 supported on the housing 32, a meter body 85 mounted on the base plate 84, the needle 56 mounted on the meter body 85, the dial 51 for showing the vehicle speed at the position pointed by the needle 56, the character-illuminating LED group 65 for illuminating the dial 51, a dial light guide 86 for guiding light of the character-illuminating LED group 65 to the dial 51, an illumination case 87 enclosing the dial light guide 86 to prevent the leakage of light of the character-illuminating LED group 65 and also serving as a reflector, the needle-illuminating LED group 75 for illuminating the needle 56, a needle light guide 88 for guiding light of the needle-illuminating LED group 75 to the needle 56, and a partitioning member 89 for separating the needle light guide 88 from the dial light guide 86.

The tachometer 36, coolant temperature gauge 37 and fuel gauge 38 shown in FIG. 2 each have a substantially identical configuration to that of the speedometer 35, and will not be described in detail.

The base plate 84 is a single base plate on which the speedometer 35, tachometer 36, coolant temperature gauge 37, fuel gauge 38 and liquid crystal display 39 are mounted.

Figure 5:
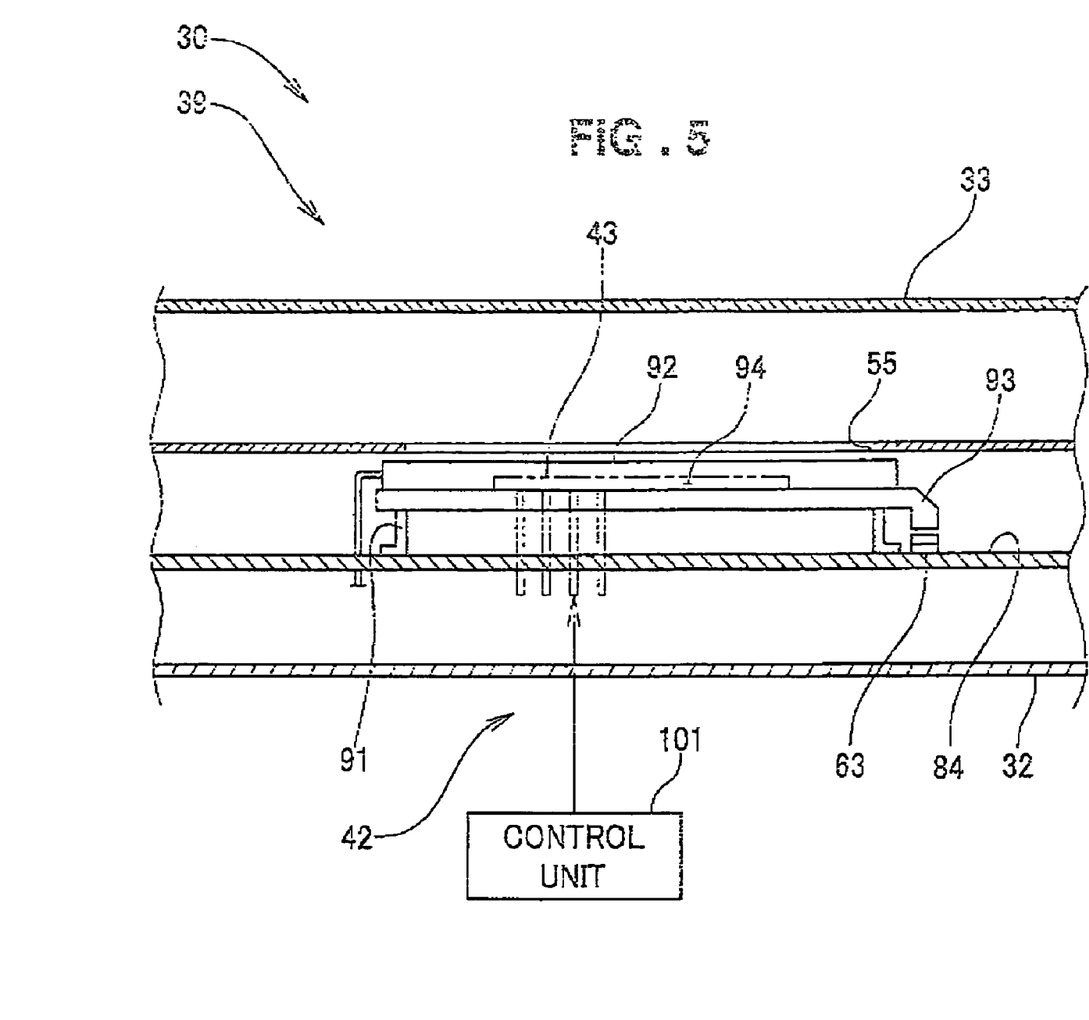
FIG. 5 is a cross-sectional view of a liquid crystal display of FIG. 2.

FIG. 5 illustrates the liquid crystal display 39 of the meter unit 30 including the vehicle fuel mileage meter 42 according to the present invention.

The liquid crystal display 39 and fuel mileage display 43 include the base plate 84 on which the speedometer 35 (see FIG. 4) and other components are mounted, a liquid-crystal-illuminating LED 63 mounted on the base plate 84, a holder 91 mounted on the base plate 84, a liquid crystal light guide 93 mounted on the holder 91, a liquid crystal device (LCD) 92 for the liquid crystal display 39 placed on the liquid crystal light guide 93 and mounted on the base plate 84, and a liquid crystal device 94 for the fuel mileage display 43 placed on the liquid crystal light guide 93 and mounted on the base plate 84. Light from the liquid-crystal-illuminating LED 63 is guided by the liquid crystal light guide 93 to the rear surfaces of the liquid crystal devices 92 and 94, illuminating the liquid crystal devices 92 and 94. On the fuel mileage display 43, fuel mileage is displayed via a control unit 101 as will be described below.

Figure 6:
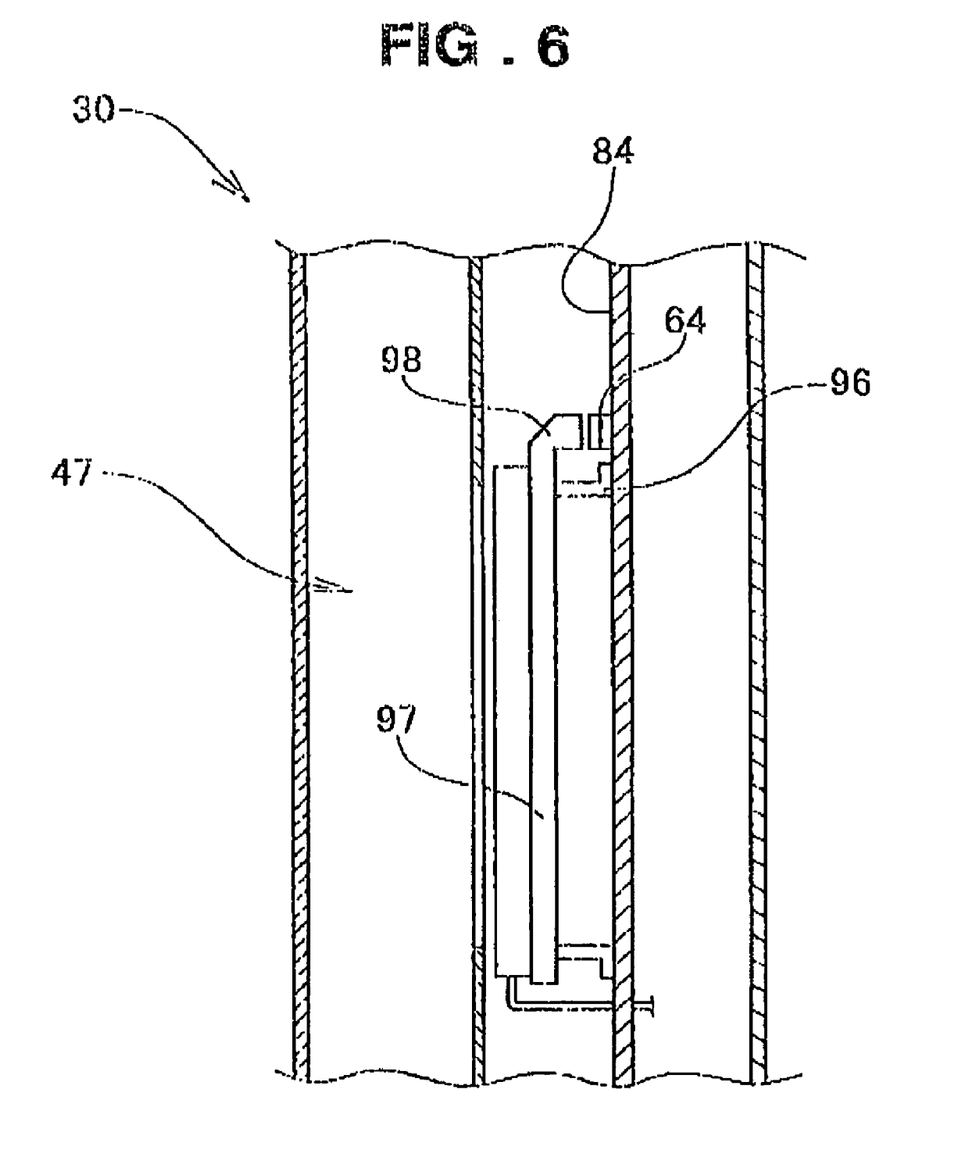
FIG. 6 is a cross-sectional view of an abnormality display for showing abnormality in the systems of FIG. 2.

The abnormality display 47 shown in FIG. 6 for showing abnormality in various systems of the vehicle 10 has a substantially identical configuration to that of the liquid crystal display 39 and fuel mileage display 43 shown in FIG. 5. Reference numeral 64 denotes a display-illuminating LED, 84 the base plate, 96 a holder, 97 a color LCD, and 98 a color LCD light guide.

Figure 7:
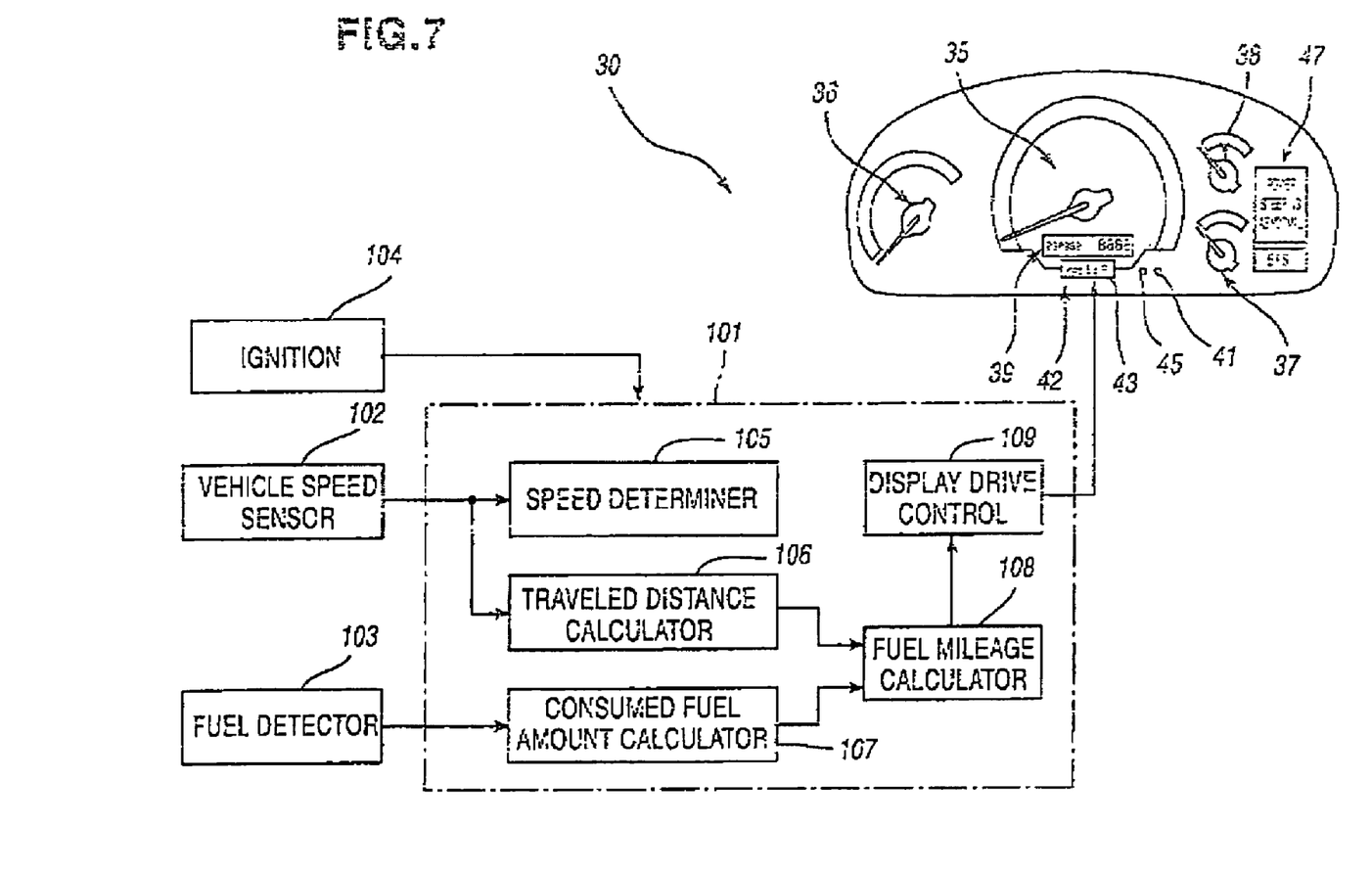
FIG. 7 is a block diagram illustrating electrical functions of the vehicle fuel mileage meter of the present invention.

FIG. 7 is a block diagram of the vehicle fuel mileage meter 42 of the present invention. The vehicle fuel mileage meter 42 consists of the fuel mileage display 43 for showing fuel mileage, the control unit 101 for controlling display of fuel mileage on the fuel mileage display 43 based on the distance traveled and the amount of fuel consumed after the vehicle speed exceeds a predetermined threshold, and the display button 45 for making the fuel mileage display 43 to display fuel mileage.

The control unit 101 consists of a speed determiner 105 to determine whether the vehicle speed exceeds a predetermined threshold based on information from a speed sensor 102, a traveled distance calculator 106 for calculating the distance traveled based on information from the speed sensor 102, a consumed fuel amount calculator 107 for calculating the amount of fuel consumed based on information from a fuel detector 103, a fuel mileage calculator 108 for calculating fuel mileage from the traveled distance and the consumed fuel amount calculated by the traveled distance calculator 106 and the consumed fuel amount calculator 107, and a display drive controller 109 for drive control for displaying fuel mileage calculated by the fuel mileage calculator 108 on the fuel mileage display 43. Reference numeral 104 denotes an ignition.

In summary, the vehicle fuel mileage meter 42 has the fuel mileage display 43 for displaying the fuel mileage of the vehicle 10 (see FIG. 1) and the control unit 101 for controlling display of fuel mileage on the fuel mileage display 43 based on the distance traveled and the amount of fuel consumed after the vehicle speed exceeds the predetermined threshold.

If the displayed fuel mileage is one from actual driving, it can be utilized as useful information for the driver. The driver can be easily aware that "the driving with relatively less waits at stoplights has led to the improved fuel economy" or "the driving down crowded streets has led to the lower fuel economy," for example.

For the purpose, the control unit 101 for controlling display of fuel mileage on the fuel mileage display 43 based on the distance traveled and the amount of fuel consumed after the vehicle speed exceeds the predetermined threshold is provided to exclude the amount of fuel consumed in idling at starting, for example, from the calculation of fuel mileage. As a result, an approximate value of fuel consumed in actual traveling can be displayed to provide the driver with useful fuel mileage information.

Now, an operation of the vehicle fuel mileage meter 42 will be described with reference to a flowchart shown in FIG. 8.

ST11: It is determined whether the ignition 104 is "ON." In other words, it is determined whether the engine is started. When the answer is YES, the process proceeds to ST12, and when NO, repeats ST11.

ST12: When the ignition 104 is turned "ON," the display drive controller 109 operates to reset the fuel mileage of the fuel mileage display 43. That is, the fuel mileage (e.g., "20.5 km/l") displayed at the previous traveling is reset.

ST13: In response to a signal supplied from the display drive controller 109, the expression "Calculating Fuel mileage" is displayed on the fuel mileage display 43.

ST14: With the vehicle speed as V and the predetermined speed threshold as Va (e.g., 5 km/h), it is determined whether or not the vehicle speed V exceeds the speed threshold Va at the speed determiner 105. When the answer is YES, the process proceeds to ST15, and when no, repeats ST14.

ST15: Measurement of the distance traveled is started at the traveled distance calculator 106.

ST16: Measurement of the amount of consumed fuel is started at the consumed fuel amount calculator 107.

ST17: It is determined whether the display button 45 is turned "ON." When the answer is YES, the process proceeds to ST18, and when no, the process is terminated.

ST18: Intermediate fuel mileage at the time when the display button 45 is turned "ON" is displayed.

ST19: It is determined whether the ignition 104 is "OFF." When the answer is YES, the process proceeds to ST20, and when NO, returns to ST 17.

ST20: Final fuel mileage at this driving is displayed on the fuel mileage display 43 as "23.0 km/l," for example.

Figure 8:
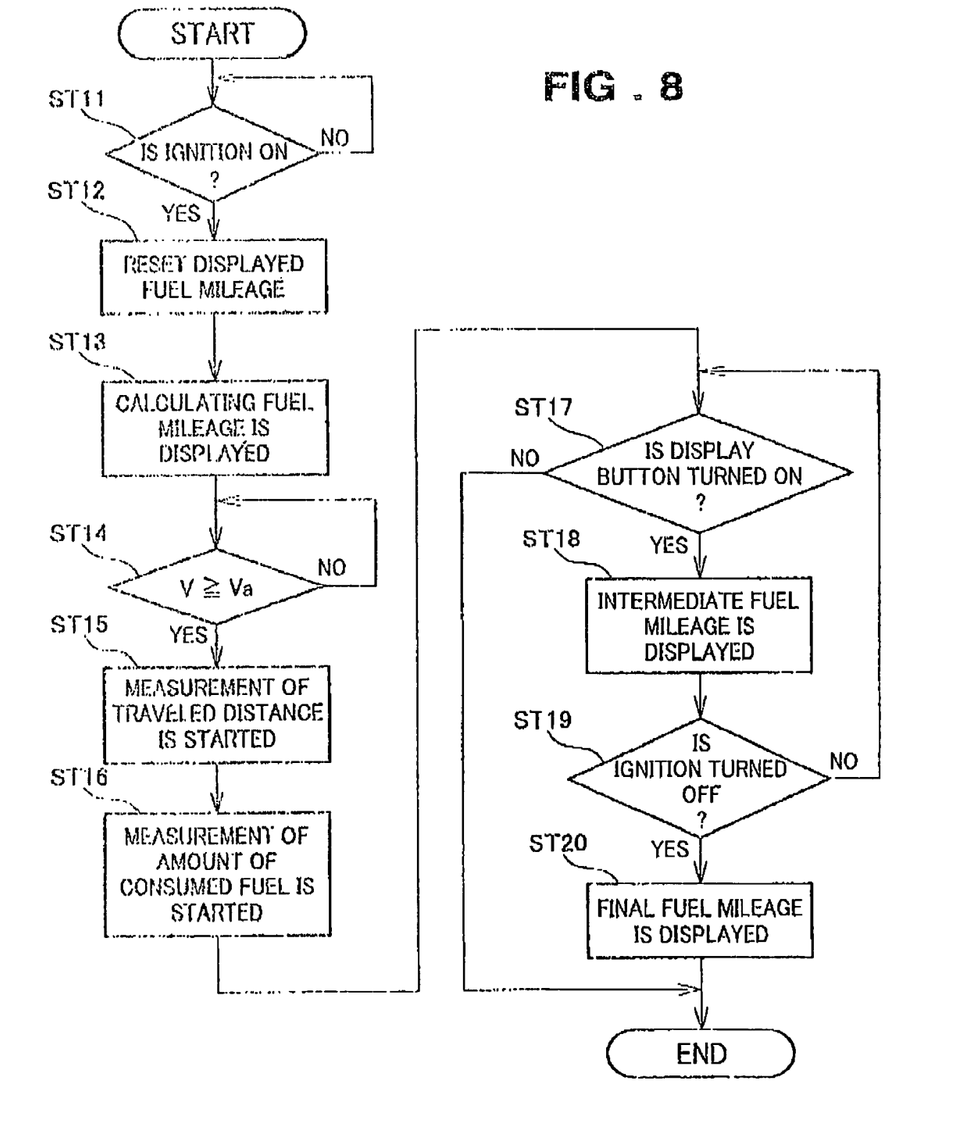
FIG. 8 is a flowchart illustrating an operation of the fuel mileage meter of FIG. 7.

The embodiment has been described with the example of displaying intermediate fuel mileage by pushing the display button 45 as shown in FIG. 8, but is not limited thereto. It is also possible to push the display button 45 for reset and then again push the display button 45 or turn the ignition 104 OFF to display fuel mileage after the reset.

The embodiment has the fuel mileage meter 42 incorporated in the meter unit 30 as shown in FIG. 2 but is not limited thereto. The fuel mileage meter 42 may be provided in any appropriate place inside the passenger compartment 11 other than the meter unit 30.

The present disclosure relates to the subject matter of Japanese Patent Application No. 2002-202386, filed Jul. 11, 2002, the disclosure of which is expressly incorporated herein by reference in its entirety.

What is claimed is:

1. A fuel mileage meter for a vehicle, comprising:
    a fuel mileage display for displaying a rate of fuel consumption of the vehicle; and
    a control unit for controlling, the display of the fuel consumption rate on said fuel mileage display, wherein the displayed fuel consumption rate is based on a distance traveled and an amount of fuel consumed only after a speed of the vehicle exceeds a predetermined threshold.

2. A fuel mileage meter as set forth in claim 1, for a vehicle, comprising:
    a fuel mileage display for displaying a rate of fuel consumption of the vehicle; and
    a control unit for controlling, based on a distance traveled and an amount of fuel consumed only after a speed of the vehicle exceeds a predetermined threshold, display of the fuel consumption rate on said fuel mileage display,
    wherein said control unit comprises a traveled distance calculator for calculating a distance traveled after the vehicle speed exceeds the predetermined threshold, a consumed fuel amount calculator for calculating an amount of fuel consumed after the vehicle speed exceeds the predetermined threshold, and a fuel mileage calculator for calculating a fuel mileage based on the traveled distance and the consumed fuel amount.

3. A fuel mileage meter as set forth in claim 1, wherein said fuel mileage display is provided at a meter indicator portion.

4. A fuel mileage meter as set forth in claim 1, wherein said control unit comprises a traveled distance calculator for calculating a distance traveled after the vehicle speed exceeds the predetermined threshold, a consumed fuel amount calculator for calculating an amount of fuel consumed after the vehicle speed exceeds the predetermined threshold, and a fuel mileage calculator for calculating a fuel mileage based on the traveled distance and the consumed fuel amount.

5. A fuel mileage meter as set forth in claim 2, wherein said fuel mileage display is provided at a meter indicator portion.

\* \* \* \* \*